United States Patent [19]

Komine et al.

[11] Patent Number: 4,985,713

[45] Date of Patent: Jan. 15, 1991

[54] TIME RECORDER HAVING BELT PRINTING TYPES

[75] Inventors: Hidemi Komine; Yoshio Miyagi, both of Yokohama, Japan

[73] Assignee: Amano Corporation, Yokohama, Japan

[21] Appl. No.: 442,987

[22] Filed: Nov. 28, 1989

[51] Int. Cl.[5] .................... G01D 15/20

[52] U.S. Cl. .................... 346/82; 346/96

[58] Field of Search .................... 346/82, 96

[56] References Cited

U.S. PATENT DOCUMENTS

| | | | |
|---|---|---|---|
| 3,942,182 | 3/1976 | Sato | 346/82 X |
| 4,381,511 | 4/1983 | Suzuki | 346/82 X |

*Primary Examiner*—George H. Miller, Jr.

*Attorney, Agent, or Firm*—Wenderoth, Lind & Ponack

[57] ABSTRACT

A printing portion of a time recorder having belt printing types comprises a plurality of hour-use belt printing types arranged in a row on a surface of a first belt and gradually fed by hour unit in accordance with a time signal, a plurality of minute-use belt printing types arranged in a row on a surface of a second belt and gradually fed by minute unit in accordance with a time signal, and urging and rotating means for urging printing typefaces of the printing types arranged on the first and second belts against a printing surface of a time card inserted into the time recorder and rotating the same in order to effect a printing on the printing surface of the time card.

2 Claims, 5 Drawing Sheets

TIME RECORDER HAVING BELT PRINTING TYPES

BACKGROUND OF THE INVENTION

1. Field of the Invention

This invention relates to a timer recorder having belt printing types, in which printing types formed particularly on an outer surface of an endless belt is used as a printing portion for printing time on a timer card.

2. Brief Description of the Invention

The conventional time recorders for printing time can be classified into two types. The first one is a mechanical type which uses, as a printing means, a printing wheel having hour-use printing types and minute-use printing types formed on its peripheral surface and a printing hammer. The other is an electronic type which uses, as a printing means, a'printer such as, for example, a dot printer and thermal printer.

Among the two types of time recorders mentioned above, the electronic time recorder is widely used these days. This electronic timer recorder has a feature that printing speed is very fast because it employs a printer. In addition, it has such convenient features as memory means, tabulation means and the like. However, as it is provided with such a complicated apparatus as a microcomputer as its control unit, it is invevitable that the price becomes comparatively higth. This is the reason why mechanical type time recorders are still used in not a small number even at present.

However, the mechanical type time recorder using the printing wheel and a printing hammer has the following shortcoming. That is, the size of the printing wheel is difficult to be made small because it is restricted by the size and number of the hour-use printing types and minute-use printing types formed on its peripheral surface. As a consequence, the time recorder becomes inevitably large in size and heavy in weight as a whole because of the physical size of the printing wheel. Furthermore, it has such inconveniences as that the printing wheel is complicated to manufacture and the cost is high, and when the printing position is changed by moving the printing block with respect to a time card, a smooth movement is difficult to obtain due to the heavy weight of the printing wheel.

The present invention has been developed in order to overcome the above-mentioned problems.

SUMMARY OF THE INVENTION

It is therefore an object of the present invention to provide a time recorder having belt printing types, in which a printing portin can be made small in size and light in weight as a whole and thus the time recorder can be made small in size and light in weight as a whole.

Another object of the present inention is to provide a time recorder having belt printing types, in which the printing block can be moved in the horizontal direction by a small force and with ease.

A further object of the present invention is to provide a time recorder having belt printing types, which is simple in structure and easy to manufacture.

A still further object of the present invention is to provide a time recorder having belt printing types, in which a printing sound can be reduced.

In order to achieve the above-mentioned objects, there is essentially provided a time recorder having belt printing types, characterized in that a printing portion comprises a plurality of hour-use belt printing types arranged in a row on a surface of a first belt and gradually fed by hour unit in accordance with a time signal, a plurality of minute-use belt printing types arranged in a row on a surface of a second belt and gradually fed by minute unit in accordance with a time signal, and urging and rotating means for urging printing typefaces of said printing types arranged on said first and second belts against a printing surface of a time card inserted into the time recorder and rotating the same in order to effect a printing on the printing surface of said time card.

The urging and rotating means comprises, for example, printing block frame pivotably mounted on a fixed frame on the side of the recorder body and including said hour-use belt printing types and minute-use belt printing types which are looped around a pair of feed gears which are mounted in vertical relation whith each other, and a printing solenoid which is excited when the time card is inserted and causes said printing block frame to be pivoted to urgedly contact the printing type faces of the respective belt printing types onto the printing surface of such inserted time card.

The above and other objects and features of the present invention will become more apparent from the following description taken into connection with the accompanying drawings.

DETAILED DESCRIPTION OF THE PREFERRED EMBODIMENT

The preferred embodiment of a timer recorder having belt printing types according to the present invention will be described hereinafter with reference to the acompanying drawings.

Figure 1:
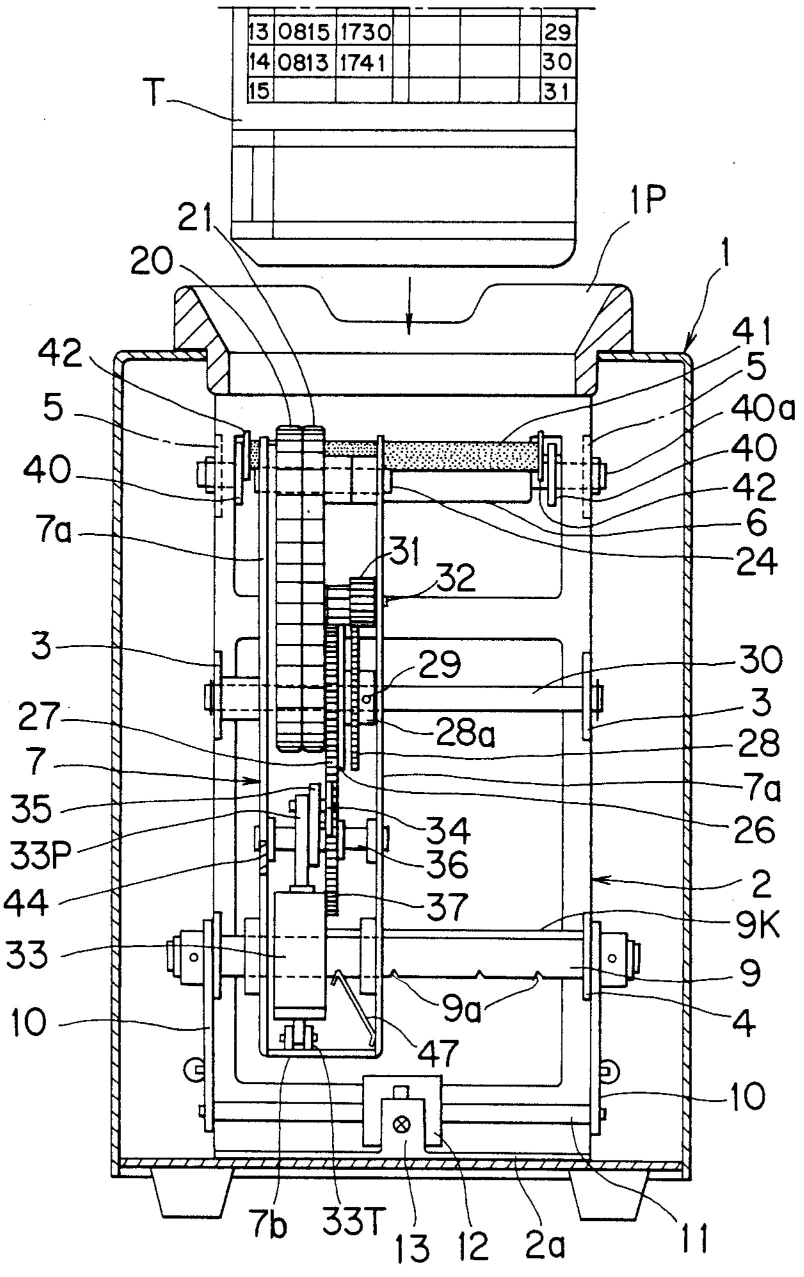
FIG. 1 is a partly cutaway front sectional view of a time recorder having belt printing types according to the present invention.
Figure 2:
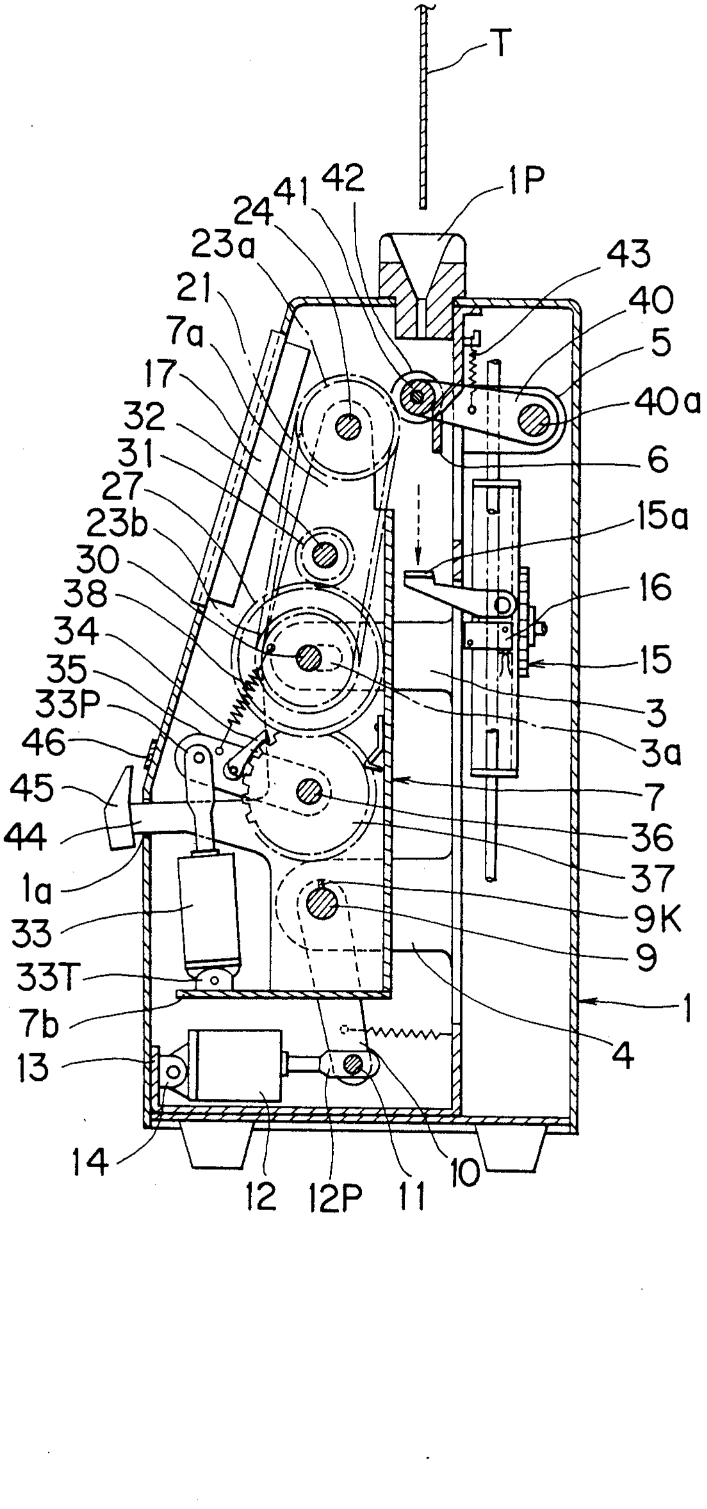
FIG. 2 is a side sectional view thereof.
Figure 7:
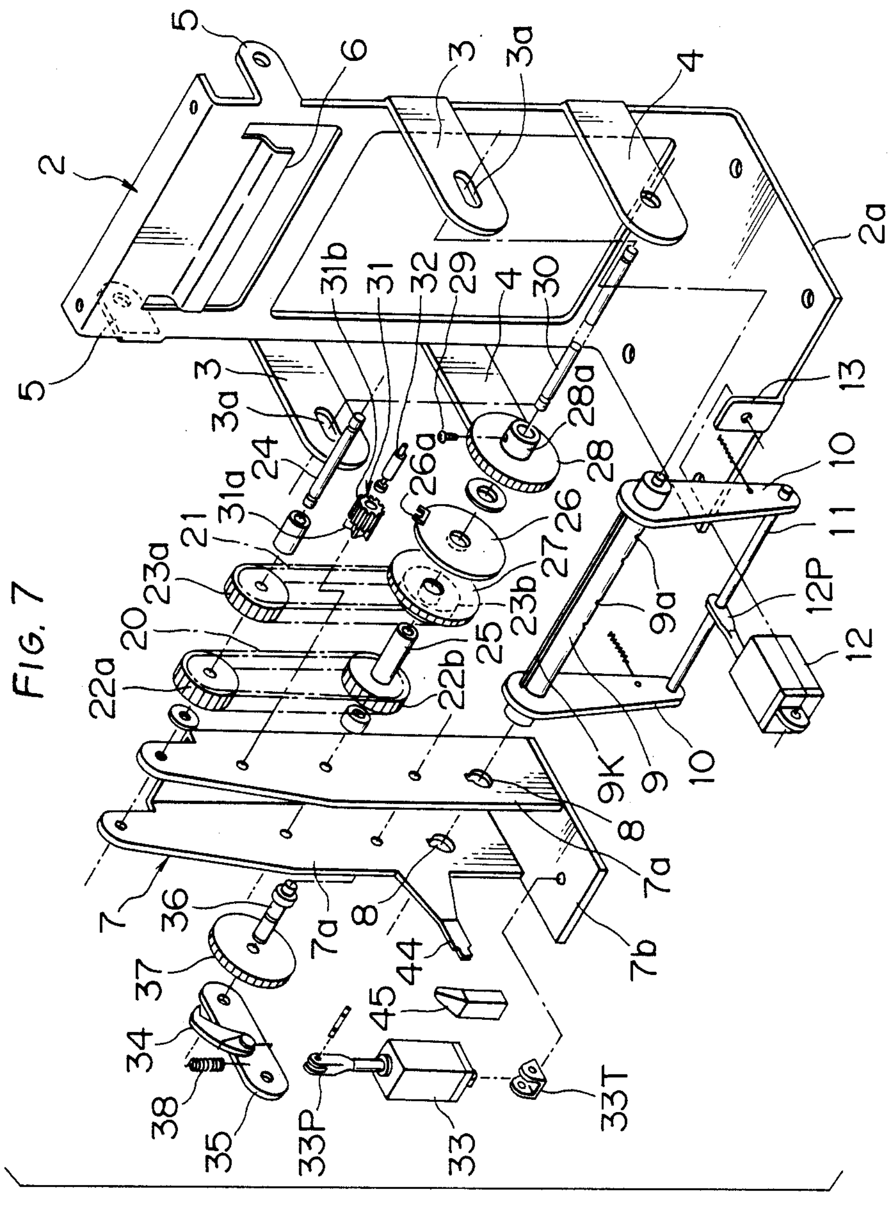
FIG. 7 is an exploded perspective view of an internal apparatus of FIG. 7.

FIG. 1 is a front sectional view showing an overall picture of a time recorder having belt printing types (but a card feeder is omitted therefrom) according to the present invention, FIG. 2 is a side sectional view, and FIG. 7 is an exploded perspective view of the whole system. In these figures, the reference numeral 1 denotes a recorder body, the reference numeral 2 denotes a fixed frame which is mounted within the recorder body 1, the reference numerals 3, 3 denote a pair of supporting arms projecting toward a front surface of the fixed frame 2 at its middle state, the reference numerals 4,4 likewise denote a pair of supporting arms projecting toward the front surface of the fixed frame 2 at its lower stage, the reference numerals 5,5 denote a pair of supporting arms projecting toward a rear surface of the fixed frame 2 at its upper stage, and the reference numeral 6 denotes a platen portion which is formed by cutting and warping a plate surface of the fixed frame 2 at its upper stage.

The reference numeral 7 denotes a printing block frame having a generally C-shaped configuration in section, and the reference symbolic numerals 7*a*, 7*a* denote a pair of side plates, and the reference symbolic numeral 7*b* denotes a bottom plate. The whole structure of the printing block frame 7 is pivotably mounted on the fixed frame 2 by inserting an operaating shaft 9 with a key 9K projecting therefrom into key groves 8,8 formed in lower portions of the pair of side plates 7*a*, 7*a* and arranging both ends of the operating shaft 9 to be rotatably supported by shaft receiving holes 4*a*, 4*a* of the lower stage supporting arms 4, 4. The reference numerals 10, 10 denote operating arms which are fixed to both end portions of the operating shaft 9. The operating arms 10, 10 are provided with an arm 11 stretched therebetween at lower parts of the operating arms 10, 10. The arm shaft 11 is provided with a plunger 12P of a printing solenoid 12 connected to an intermediate part thereof. The reference numeral 13 denotes a mounting piece for the use of the solenoid 12 and disposed on the botton plate 2*a* of the fixed frame 2. The solenoid 12 is pivotally attached to the mounting piece 13 by a mounting metal piece 14. The printing solenoid 12 is designed such that when a time card T, which is inserted through a card pocket 1P of the recorder body 1, hits a card receiving lever 15*a* of a card feeder 15 shown in FIG. 2 and a printing stage is established, a microswitch 16 is turned on by the card receiving lever 15*a* to excite the printing solenoid 12. The card feeder 15 is adapted to feed the card receiving lever 15*a* by one stage per day in order to establish the printing stage in accordance whith a operating signal which is sent from a clock portion 17 of the recorder body 1 once a day. As the construction of such card feeder 15 is known, a detailed description thereof will be omitted.

Figure 4:
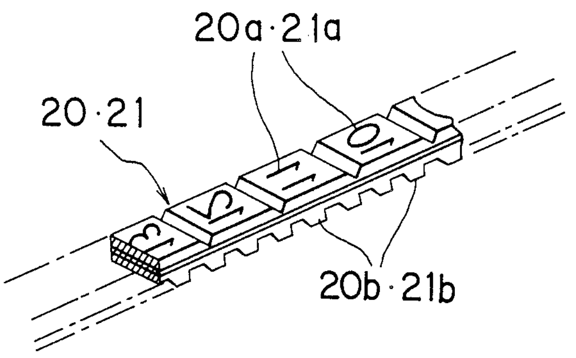
FIG. 4 is a perspective view showing a part of the printing types.
Figure 5:
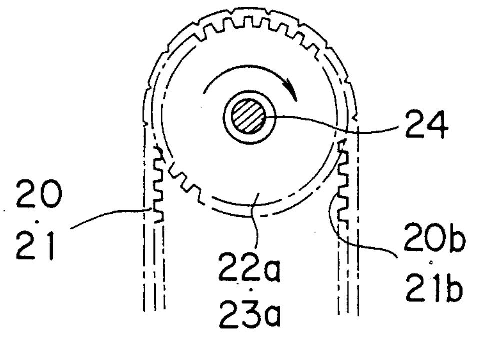
FIG. 5 is a structural view showing one example of means for feeding the printing types formed on the belt.

The reference numeral 20 denotes hour belt printing types, while the reference numeral 21 denotes minute belt printing types. Both the types 20 and 21 are formed on endless belts. As is shown in FIG. 4, the belt printing types 20 and 21 are provided with hour printing types 20*a* . . . and minute printing types 21*a* . . . , which are continuously formed on the outer surfaces of the belt printing types 20 and 21 at equal spaces. On the other hand, serrated portions 20*b* . . . , 21*b* . . . are continuously formed on the inner surfaces of the belt printing types 20 and 21.

Such constructed belt printing types 20 and 21 are looped around two pairs of feed gears 22*a* and 22*b*, 23*a* and 23*b*, respectively. The reference numeral 24 denotes a mounting shaft adapted to rotatably support the upper feed gears 22*a* and 23*a* between upper end portions of the printing block frame 7. The lower feed gear 22*b* for the hour belt printing types 20 is provided with a cylindrical shaft 25 integrally formed on a side surface of the lower feed gear 22*b* as shown in FIG. 7. The cylindrical shaft 25 is provided with a minute feed gear 27 rotatably mounted thereon. The minute feed gear 27 is provided with the lower feed gear 23*b* for the minute printing types 21 fixed to one side surface thereof and a carry slide wheel 26 having a carry claw 26*a* and fixed to the other side surface of the cylindrical shaft 25. Furthermore, the cylindrical shaft 25 is provided with and hour feed gear 28 fixed to a front end thereof. The reference symbolic numeral 28*a* denotes a boss of the hour feed gear 28 for permitting a front end of the cylindrical shaft 25 to be penetrated therethrough and fixed by a set machine screw 29, and the reference numeral 30 denotes a gear shaft which is inserted into the cylindrical shaft 25 and adapted to support the gears 22*b*, 27 and 28 between the middle stages of the printing block frames 7. Both ends of this gear shaft 30 is supported in such a manner as to be able to move within horizontal elongaged holes 3*a*, 3*a* formed in the middle stage supporting arms 3, 3 of the fixed frame 2. The reference numeral 31 denotes a carry pinion rotatably mounted on one side plate 7*a* of the printing block frame 7 by a mounting shaft 32. Teeth 32*a* of one of the pinions 31 are placed on a peripheral surface of the slide whell 26, and teeth 31*b* of the other pinion 31 are meshed with the hour feed gear 28. When the minute feed gear 27 is rotated one full rotation (60 minutes) and the carry claw 26*a* of the slide wheel 26 feeds the pinion 31 by one tooth, the hour feed gear 28 for interlocking the lower feed gear 22*b* for the hour belt printing types 20 is fed by one tooth. As a result, one type among the hour belt printing types 20 is fed. Regarding the minute belt printing types 21, one printing type portion is fed every minute in accordance with the feeding rotation of the minute feed gear 27 which is fixedly interlocked.

Next, the reference numeral 33 denotes a solenoid for feed printing types mounted on the bottom plate 7*b* of the printing block frame 7 by a mounting metal piece 33T. A plunger 33P of this solenoid 33 is connected to one end of a pivot arm 35 having a feed claw 34 mounted thereon. The reference numeral 36 denotes a supporting mounting shaft adapted to support a minute feed driving gear 37 and the pivot arm 35 between the printing block frames 7. The gear 37 is meshed with the minute feed gear 27. The solenoid 33 is excited once in one minute in accordance with a signal coming from the clock portion 17 and actuates the pivot arm 35. Also, the feed claw 34 is adapted to feed the minute feed driving gear 37 by one tooth (one minute) when the pivot arm 35 is returned by a spring 38.

The hour belt printing types 20 and the minute belt printing types 21 which are fed by hour unit and minute unit serving the solenoid 33 as a driving source are designed such that an hour printing type 20*a* and a minute printing type 21*a* corresponding to the current time are normally set at a right lower portion of the upper end portion (see FIG. 2). When the time card T is inserted and the printing solenoid 12 causes the entirety of the printing block frame 7 to be pivoted about the operating shaft 9, the printing types 20*a* and 21*a* set in the printing position are pivoted for printing toward the platen portion 6 of the fixed frame 2.

In the figures (omitted in FIG. 7), the reference numeral 40 denotes a pivot arm which is pivotably mounted on the upper stage supporting frames 5, 5 of the fixed frame 2 by a shaft 40*a* respectively. This arm 40 is provided with an ink roller 41 which is adapted to apply ink onto the belt printing types 20 and 21. The reference numeral 42 denotes a guide disk which is mounted on both end portions of the ink roller 41. This disk 42 has a larger diameter than that of the ink roller 41. The reference numeral 43 denotes a spring which is adapted to pull the pivot arm 40 in order to set the ink roller 41 normally in the upper position shown in FIGS. 1 and 2.

Figure 3:
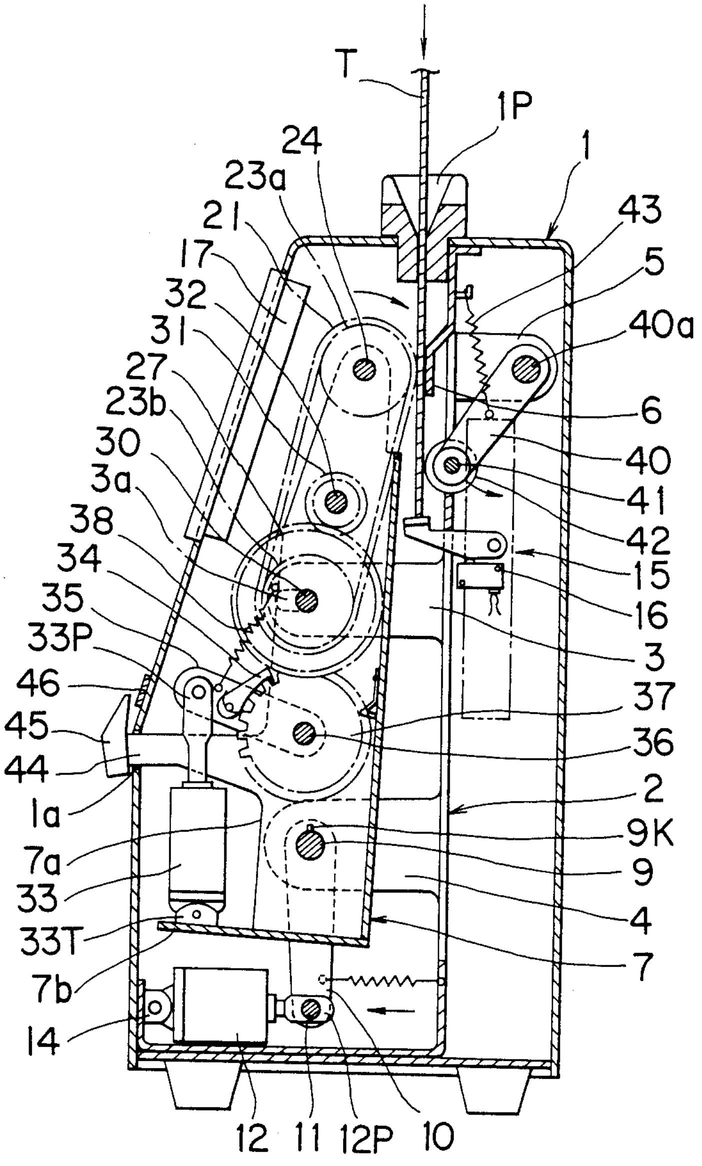
FIG. 3 is likewise a side sectional view showing when printing.

In such constructed ink applying apparatus as mentioned above, when the time card T is inserted, the lower end of the time card T is received by the guide disk 42. In accordance with the further insertion of the time card T, the spring 43 is expanded and the ink roller 41 is gradually pivoted downward. In the midway of the downward pivotal movement of the ink roller 41, the ink roller 41 is brought into contact with the printing types 20a and 21b which are set in the printing position and applies ink thereon. Finally, the ink roller 41 is pushed by the time card T and retreated backward as shown in FIG. 3. As a result, the time card T is not made dirty.

Figure 6:
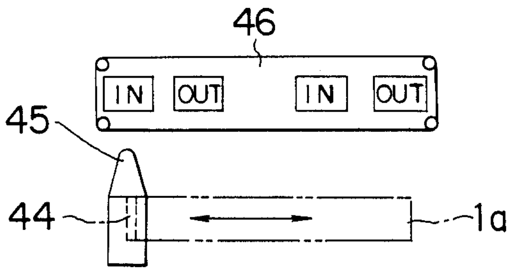
FIG. 6 is a front view showing a relation between a plate and a handle which are mounted on a front surface of a recorder body.

Next, the reference numeral 44 denotes an operating lever projecting through a front surface of one side of the printing block frame 7. The front end of the operating lever 44 is projected from a horizontal hole 1a formed in the front surface of the body 1. This front end of the operating lever 44 is provided with a handle 45 attached thereto. Arrangement being such that by manipulating the handle 45, the entire printing block frame 7 can be moved in the horizontal direction along the operating shaft 9. The reason why the entire printing block frame 7 is arranged to be able to move in the horizontal direction is that by this, the printing types 20a and 21a of the belt printing types 20 and 21 can be set for printing in any four in and out printing columns (see FIG. 1) formed on the time card T. The front surface of the body 1 is provided with a marking plate 46 for indicating the printing position as shown in FIG. 6. The reference symbolic numeral 9a . . . denote positioning grooves which are formed in the operating shaft 9, and the reference numeral 47 denotes a spring piece which is adapted to engage with the groove 9a in order to correctly position the printing block frame 7.

Besides the above-mentioned hour-use and minute-use belt printing types 20 and 21, data-use and month-use belt printing types may be adopted as belt printing types in accordance with necessity.

The operation of a timer recorder having belt printing types the present invention will now be described.

The hour-feeding and minute-feeding of the belt printing types 20 and 21 are performed by serving the minute-feed driving gear 37, which is fed by the feed claw 34 every minute, as a driving source the same as in the conventional printing wheel. For printing, when the printing solenoid 12 is excited upon insertion of the time card T, the entire printing block frame 7 is pivoted to urge the printing types 20a and 21a against the time card T as shown in FIG. 3 and the time card T is sandwiched between the printing block frame 7 and the platen portion 6. Therefore, the printing of time can be correctly effected on the time card T. Further, at a time when the time card T is inserted, the ink roller 41 is brought to be contacted with the type faces of the respective printing types 20a and 21a and applies ink thereto. Accordingly, a clear printing can be obtained every time the time card T is inserted. Moreover, as the ink roller 41 is provided with the guide disk 42 having a large diameter, the time card T is prevented from being made dirty with ink.

As described in the foregoing, according to the present invention, the printing portion comprises belt printing types insetead of the conventional printing wheel. Therefore, by making the belt printing types looped around a pair of feed gears which are mounted in vertical direction with each other, the entire system can be made flat and compact. The weight can also be reduced greatly. This enables to make the time recorder small in size and light in weight as a whole. Moreover, as the belt printing types, which are light in weight, are used, the printing types can be fed smoothly with a small force. Furthermore, as the printing type block can be moved with a small force, the printing position can be changed with ease. Moreover, according to the present invention, the belt printing types are directly urged against the time card for printing instead of the conventional hammer, there can be expected such useful effects as that the operating solenoid can be made small and the printing sound can be reduced. In addition, the present invention is simple in structure and inexpensive to manufacure. As seen in the foregoing, the time recorder having belt printing types according to the present invention is epoch making as a mechanical time recorder.

While the present invention has been described with reference to the preferred embodiment, it will be understood that the same is for illustrative purpose only and many modifications and alternations may be made within the spirit of the present invention.

What is claimed it:

1. A timer recorder having belt printing types, characterized in that a printing portion comprises a plurality of hour-use belt printing types arranged in a row on a surface of a first belt and gradually fed by hour unit in accordance with a time signal, a plurality of minute-use belt printing types arranged in a row on a surface of a second belt and gradually fed by minute unit in accordance with a time signal, and urging and rotating means for urging printing typefaces of said printing types arranged on said first and second belts against a printing surface of a time card inserted into the time recorder and rotating the same in order to effect a printing on the printing surface of said time card.

2. A time recorder having belt printing types as claimed in claim 1, wherein said urging and rotating means comprises printing block frame pivotably mounted on a fixed frame on the side of the recorder body and including said hour-use belt printing types and minute-use belt printing types which are looped around a pair of feed gears which are mounted in vertical relation with each other, and a printing solenoid which is excited when the time card is inserted and causes said printing block frame to be pivoted to urgedly contact the printing type faces of the respective belt printing types onto the printing surface of such inserted time card.

* * * * *